United States Patent
Lowery et al.

(10) Patent No.: US 11,829,704 B2
(45) Date of Patent: *Nov. 28, 2023

(54) DYNAMIC WEB CONTENT BASED ON CONTEXTUAL PROFILE

(71) Applicant: PayPal, Inc., San Jose, CA (US)

(72) Inventors: Justin Scott Lowery, San Jose, CA (US); Mark Robert Shulman, Santa Clara, CA (US); Adam Dustan, Milpitas, CA (US); Keith Burns, Austin, TX (US); Carla Lee Capps, Austin, TX (US); Francisco Ulises Garcia Martinez, Austin, TX (US); Sriram Ramakrishnan, Austin, TX (US); Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,925

(22) Filed: Mar. 31, 2022

(65) Prior Publication Data

US 2022/0222419 A1    Jul. 14, 2022

Related U.S. Application Data

(63) Continuation of application No. 17/222,905, filed on Apr. 5, 2021, now Pat. No. 11,341,313, which is a (Continued)

(51) Int. Cl.
*G06F 40/106* (2020.01)
*G06F 16/958* (2019.01)
(Continued)

(52) U.S. Cl.
CPC ........ *G06F 40/106* (2020.01); *G06F 16/9535* (2019.01); *G06F 16/972* (2019.01);
(Continued)

(58) Field of Classification Search
None
See application file for complete search history.

(56) References Cited

U.S. PATENT DOCUMENTS 9,037,914 B1    5/2015  Au et al.
9,245,250 B2    1/2016  Williams
(Continued)

OTHER PUBLICATIONS

Hristova M., Dynamic Web Pages, retrieved from https://www.ischool.utexas.edu/~hristova/ia, on Nov. 1, 2017, 5 pages.
(Continued)

*Primary Examiner* — Ariel Mercado
(74) *Attorney, Agent, or Firm* — Haynes and Boone, LLP

(57) ABSTRACT

Dynamic web content personalization may be used to alter a web page such that two different people who view that web page do not see the exact same content on that page. The present disclosure includes techniques that allow a web page to be structured, via underlying source code, so that content can be dynamically generated based on a user transaction history. Further, dynamic content customization can effectively change the layout and functionality of a web page in ways not previously contemplated. For example, different control elements may become accessible based on a particular contextual user profile assigned to a user based on a transaction history. Modular content modules may also have a different appearance for different users.

20 Claims, 10 Drawing Sheets

Related U.S. Application Data continuation of application No. 15/835,055, filed on Dec. 7, 2017, now Pat. No. 10,970,459.

(51) Int. Cl.

| | | |
|---|---|---|
| *H04L 67/02* | (2022.01) | |
| *H04L 67/306* | (2022.01) | |
| *G06Q 20/40* | (2012.01) | |
| *G06Q 30/0241* | (2023.01) | |
| *G06F 16/9535* | (2019.01) | |
| *G06F 40/221* | (2020.01) | |
| *H04L 67/50* | (2022.01) | |

(52) U.S. Cl.
CPC ....... *G06F 40/221* (2020.01); *G06Q 20/4014* (2013.01); *G06Q 30/0277* (2013.01); *H04L 67/02* (2013.01); *H04L 67/306* (2013.01); *H04L 67/535* (2022.05)

(56) References Cited

U.S. PATENT DOCUMENTS

| | | | |
|---|---|---|---|
| 9,754,245 B1 | 9/2017 | Davison et al. | |
| 9,881,299 B2 | 1/2018 | Isaacson et al. | |
| 10,636,019 B1 | 4/2020 | Abrons | |
| 10,929,890 B2* | 2/2021 | Knab | G06F 16/9535 |
| 11,157,954 B1* | 10/2021 | Belanger | G06Q 30/0201 |
| 2003/0026404 A1 | 2/2003 | Joyce et al. | |
| 2004/0168123 A1 | 8/2004 | Lomelin-Stoupignan et al. | |
| 2004/0199609 A1 | 10/2004 | Papatla et al. | |
| 2005/0076294 A1 | 4/2005 | Dehamer et al. | |
| 2005/0193269 A1 | 9/2005 | Haswell et al. | |
| 2005/0235256 A1 | 10/2005 | Freydl | |
| 2006/0095835 A1 | 5/2006 | Kennedy et al. | |
| 2007/0043651 A1 | 2/2007 | Xiao et al. | |
| 2008/0086417 A1 | 4/2008 | Bykov et al. | |
| 2008/0214157 A1 | 9/2008 | Ramer et al. | |
| 2008/0222538 A1 | 9/2008 | Cardu | |
| 2009/0222329 A1 | 9/2009 | Ramer et al. | |
| 2010/0017704 A1 | 1/2010 | Jaffe et al. | |
| 2010/0191726 A1 | 7/2010 | Haveliwala | |
| 2011/0093790 A1 | 4/2011 | MacZuba | |
| 2011/0167332 A1 | 7/2011 | Nickas, Jr. | |
| 2011/0314090 A1 | 12/2011 | Cardu | |
| 2012/0136704 A1* | 5/2012 | Carlson | G06F 16/254 |
| | | | 705/14.36 |
| 2012/0191576 A1 | 7/2012 | Bui | |
| 2012/0215724 A1 | 8/2012 | Ross | |
| 2012/0297288 A1 | 11/2012 | Mansouri | |
| 2013/0117677 A1 | 5/2013 | St. Jacques, Jr. | |
| 2013/0311266 A1* | 11/2013 | Vichich | G06Q 30/0207 |
| | | | 705/14.27 |
| 2013/0346302 A1 | 12/2013 | Purves et al. | |
| 2014/0180826 A1 | 6/2014 | Boal | |
| 2014/0207547 A1* | 7/2014 | Cheng | G06Q 40/02 |
| | | | 705/14.17 |
| 2015/0370914 A1 | 12/2015 | Carroll et al. | |
| 2016/0179767 A1 | 6/2016 | Mavinakuli et al. | |
| 2016/0217651 A1 | 7/2016 | Emura | |
| 2017/0005959 A1 | 1/2017 | Fenlon | |
| 2017/0200141 A1 | 7/2017 | Pattajoshi | |
| 2018/0246861 A1 | 8/2018 | Charron et al. | |

OTHER PUBLICATIONS

International Appl. No. PCT/US2018/064620, International Search Report and Written Opinion dated Jan. 22, 2019, 10 pages.

International Preliminary Report on Patentability for Application No. PCT/US2018/064620 dated Jun. 18, 2020, 10 pages.

Menasce D.A., "Web Server Software Architectures", IEEE Computer Society, https://www.computer.org/internel, Nov./Dec. 2003, pp. 78-81.

Mullin S., "Why Content Personalization Is Not Web Personalization (and What to Do About It)," Aug. 11, 2017, retrieved from https://cxl.com/blog/web-personalization/, on Nov. 1, 2017, 34 pages.

Myers D., "It's All About Personalization: Why Consumer Marketers Must Tailor Content to Individuals," Aug. 2015, retrieved from https://blog.marketo.com/2015/08/its-all-about-personalization-why-consumer-marketers-must-tailor-content-to-individuals.html, on Nov. 1, 2017, 4 pages.

Niggulis O., "How to Use Personalized Content and Behavioral Targeting for Improved Conversions," May 26, 2017, retrieved from https://cxl.com/blog/personalized-content-and-behavioral-targeting/, on Nov. 1, 2017, 21 pages.

Sherbin M., "The Static Website is Dead-Long Live Personalized Content", https://contentmarketinginstitute.com/2012/10/the-static-website-is-dead-long-live-personalized-content/, 2012, pp. 1-8.

'Tutorials Point Simply Easy Learning, "WebServer"', Online Retrieved on Feb. 1, 2018, From the Internet URL: www.tutorialspoint.com/internet_technologies/web_servers.html, 3 pages.

\* cited by examiner

| Event ID | Account ID | Type | Transaction Amt | Date |
|---|---|---|---|---|
| 798744654 | 86556 | Credit Card | -$5.04 | 2017-05-28 |
| 345235896 | 86556 | ACH | -$89.98 | 2017-05-26 |
| 563454210 | 86556 | Debit | -$31.15 | 2017-05-21 |
| 982347719 | 86556 | Credit Card | -$43.42 | 2017-05-20 |
| 687685064 | 86556 | Credit Card | -$15.97 | 2017-05-20 |
| 345235896 | 86556 | Credit Card | -$104.00 | 2017-05-19 |
| 987665455 | 86556 | Transfer | +$20.00 | 2017-05-18 |
| 482347713 | 86556 | Balance | -$3.24 | 2017-05-18 |

302    304    306    308    310

Active User Transaction History 300

FIG. 3A

| Event ID | Account ID | Type | Transaction Amt | Date |
|---|---|---|---|---|
| 7987744654 | 45678 | Credit Card | +$50.48 | 2017-05-03 |
| 3452335896 | 45678 | Credit Card | +$19.56 | 2017-05-02 |
| 563454210 | 45678 | Debit | +$1.15 | 2017-04-29 |
| 9823477119 | 45678 | Credit Card | +$123.42 | 2017-04-28 |
| 6876685064 | 45678 | Balance | +$15.97 | 2017-04-24 |
| 3452335896 | 45678 | Credit Card | +$104.00 | 2017-04-23 |
| 9876654555 | 45678 | Balance | +$23.23 | 2017-04-23 |
| 4823477713 | 45678 | ACH | -$478.50 | 2017-04-20 |

Casual Seller Transaction History 350

FIG. 3B

New Active
Example Page
410

Active User Example Page 420

*FIG. 4B*

Casual Seller
Example Page
430

FIG. 4C

DYNAMIC WEB CONTENT BASED ON CONTEXTUAL PROFILE

CROSS REFERENCE TO RELATED APPLICATION

The present application is a continuation of U.S. patent application Ser. No. 17/222,905, filed Apr. 5, 2021, issued as U.S. Pat. No. 11,341,313 on May 24, 2022, which claims priority to and is a continuation of U.S. patent application Ser. No. 15/835,055 filed Dec. 7, 2017, issued as U.S. Pat. No. 10,970,459 on Apr. 6, 2021, all of which is incorporated by reference in their entirety.

TECHNICAL FIELD

This disclosure relates to automated techniques for structuring the underlying code of a web page, including dynamic generation of content, according to various embodiments.

BACKGROUND

Hypertext Markup Language (HTML) is frequently used to construct web pages. Early HTML pages were simply static—the same version of a page appeared whenever it was requested from a web server, unless the page was manually updated. As time has progressed, web pages have become more sophisticated and allowed for dynamic content in some instances. However, opportunity still exists to further improve the underlying structure of web page code to provide for better dynamic content generation.

BRIEF DESCRIPTION OF THE DRAWINGS

FIGS. 3A-3B illustrate block diagrams of transaction histories, according to some embodiments.

FIGS. 4A-4C illustrate block diagrams of web pages having dynamically generated content based on analyses of user account histories, according to some embodiments.

DETAILED DESCRIPTION

Figure 1:
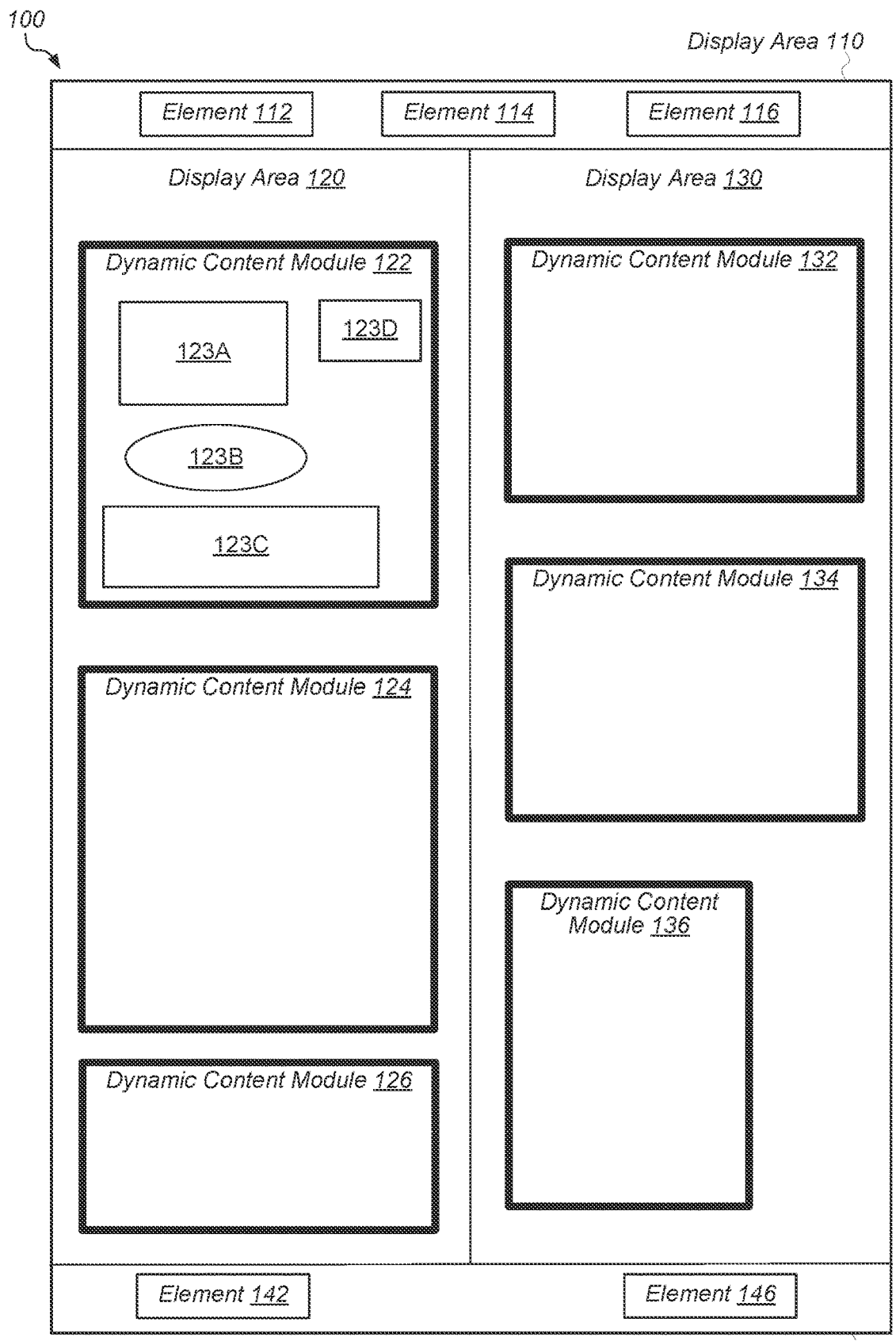
FIG. 1 illustrates a block diagram of a web page, according to some embodiments.

Dynamic web content personalization may be used to alter a web page such that two different people who view that web page do not see the exact same content on that page.

In some cases, content personalization is based on identity information for a user. A web page viewer who is believed to be a 60 year old male living in the United States, for example, might be shown an online advertisement for a luxury automobile. A viewer believed to be a 19 year old female living in Canada might instead be shown an advertisement for moderately priced clothing on the same web page, In such instances, however, the functionality of the web page may be essentially unchanged. A shopping website may still have the same general control elements regardless of the fact that different pieces of content are shown to different users. (E.g., even if one advertisement with a link to a first website is replace with a different advertisement linking to a different website, the functionality of the web page may be otherwise unchanged.)

The present disclosure includes techniques, however, that allow a web page to be structured so that content can be dynamically generated based on a contextual user profile. The user profile may include a user transaction history, as well as user interactions with particular software products, services, and/or web pages, and user account history (e.g. length of time an account has existed). User profiles are not limited to such information however. Further, dynamic content customization can effectively change the layout and functionality of a web page in ways not previously contemplated. For example, different control elements may become accessible based on a particular contextual user profile assigned to a user based on a transaction history. Modular content modules may also have a different appearance for different users. In addition to customization driven at the user level, individual, modular content areas can also be customized by the state of individual products, services or payment instruments, altering the appearance and function of the content areas to better drive customer behavior.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a web page 100 is shown, according to some embodiments. In this diagram, web page 100 includes display areas 110, 120, 130, and 140. Many different configurations of web page 100 are possible, however, and this disclosure is not limited to the format shown in FIG. 1.

Display area 110 includes elements 112, 114, and 116 as shown. These elements may include data and/or controls. Data can include any text, image, video, or audio, for example. Controls may include selectable web elements that cause something on the web page and/or within a viewing application (such as a web browser) to change in response to a user action. These controls may include buttons, forms, and other items. A user may click on a drop-down menu that provides new information and/or displays control that were previously not shown to the user. A user may also select a hyperlink to navigate to a different web page, or enlarge an image being currently displayed using controls, for example.

Many different types of page controls (and corresponding response actions) are possible. Display area 140 likewise includes elements 142 and 146, which may similarly include data and/or page controls.

Display area 120 includes dynamic content modules 122, 124, and 126, while display area 130 includes dynamic content modules 132, 134, and 136, in the embodiment shown. In this example, display areas 120 and 130 are organized as columns in web page 100, however, other configurations are possible. Web page 100 may have greater or fewer numbers of display areas, and these areas do not need to be equal in size or shape.

Content module 122 includes content pieces 123A, 123B, 123C, and 123D. These content pieces may include text, audio, video, still images, etc., and may include control elements as well. These content pieces may also be personalized for a user in various instances. Thus, content piece 123A could tell a user the balance of currency (or another quantity) that she has in an account, such as a PayPal™ account. Various account or other information (directly related or not directly related to a user's account) may be shown in content pieces such as 123A. Although not shown in FIG. 1, other content modules may also have one or more of their own content pieces, which can be dynamically generated when web page 100 is created for a user. In various embodiments, content modules such as content module 122 are self-contained modules, as described more fully below relative to FIG. 6.

In the example of FIG. 1, display areas 120 and 130 are configurable display areas that are configured to be populated with dynamic content based on contextual user profiles for the first user, while display areas 110 and 140 are not configured to be populated with dynamic content based on a contextual user profile. In other words, display areas 120 and 130 may include different dynamic content based on the identity of a user, while display areas 110 and 140 will show the same content for all users regardless of identity, in various embodiments. Additional example embodiments are shown relative to FIGS. 4A-34.

A contextual user profile can be determined for a user that can be used to generate dynamic content in display areas 120 and 130, in various embodiments. The contextual user profile can determine not only which dynamic content modules are loaded in these display areas (and where they are located on the web page), but also the particular content pieces that are in the content modules, in some embodiments.

Thus, one user might see dynamic content module 122 while another user might not (or at least not without taking an additional action). Further, the view of content in dynamic module 122 could also be different for a first user than a second user (e.g., the first user might see content piece 123C, while another user might not). In other words, the contextual user profile for a user can affect the entire structure and content of display areas 120 and 130, including the underlying code affecting the layout of web page 100. (Note generally that concepts and techniques described relative to dynamic content module 122 and display areas 120 and 130 may apply to other dynamic content modules and/or other display areas, in various embodiments.)

Figure 2:
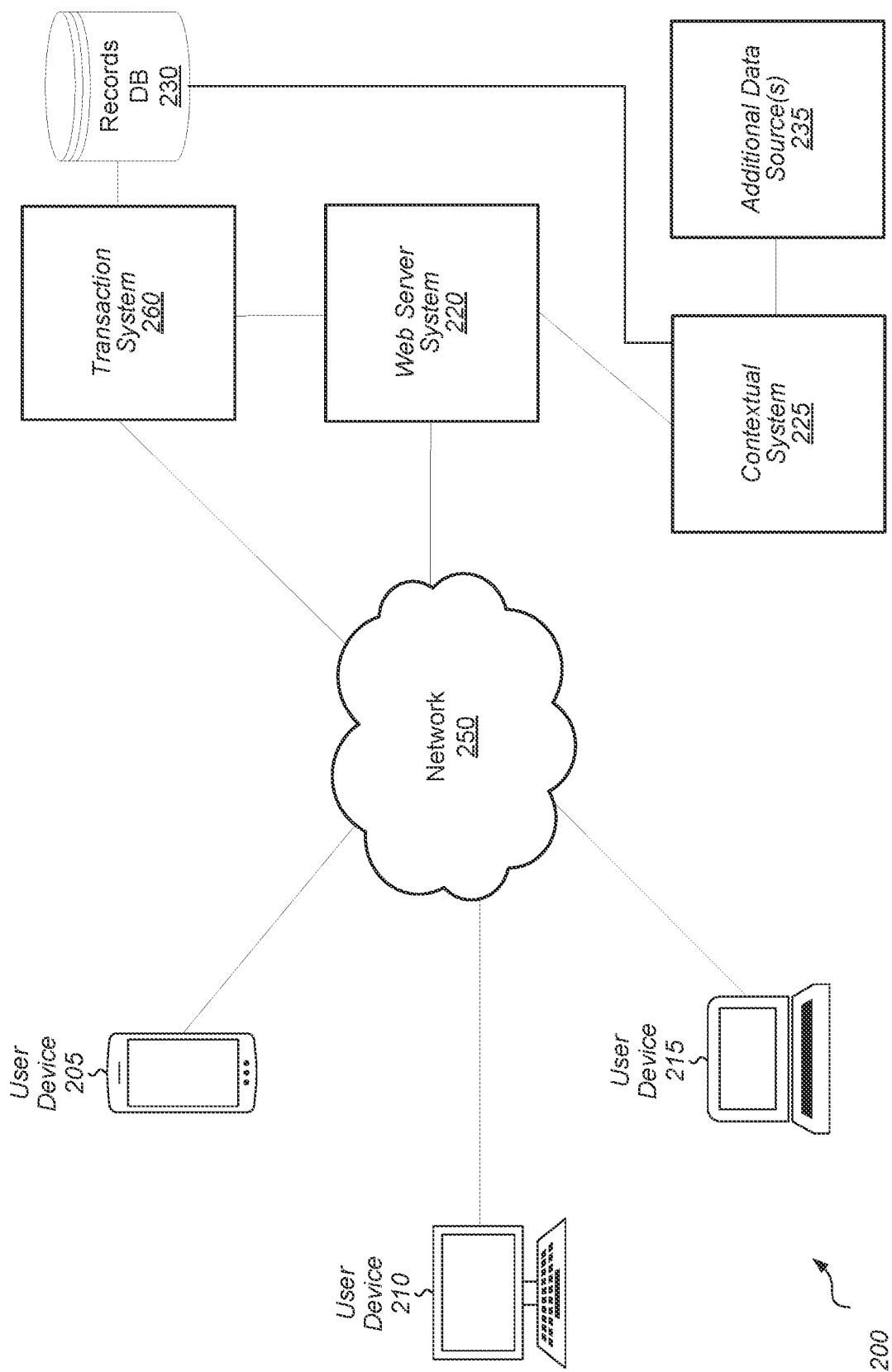
FIG. 2 illustrates a system that includes users devices, a web server system, a contextual system, a transaction system, a network, and a records database according to some embodiments.

Turning to FIG. 2, a block diagram of a system 200 is shown, according to some embodiments. In this diagram, system 200 includes user devices 205, 210, 215, a web server system 220, a contextual system 225, a transaction system 260, and a network 250. Also depicted is records DB (database) 230 and additional data source(s) 235. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

User devices 205, 210, and 215 may be any type of computing device. Thus, these devices can be a smartphone, laptop computer, desktop computer, tablet computer, etc. As discussed below, user devices such as 205, 210, and 215 may engage in various actions, including transactions, using transaction system 260. Web server system 220 and contextual system 225 may comprise one or more computing devices each having a processor and a memory, as may transaction system 260. Network 250 may comprise all or a portion of the Internet. Web server system 220 and contextual system 225 may be controlled by an entity who provides an electronically provided service, which may be an electronic transaction payment service in some instances (allowing for transfer of currency or other quantities).

Transaction system 260 may correspond to an electronic payment service such as that provided by PayPal™. Transaction system 260 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 205, 210, and 215 can be used to access electronic payment accounts such as those provided by PayPal™. In various embodiments, quantities other than currency may be exchanged via transaction system 260, including but not limited to stocks, commodities, gift cards, incentive points (e.g. from airlines or hotels), etc.

Records database (DB) 230 includes records related to various transactions taken by users of transaction system 260. These records can include any number of details, such as any information related to a transaction or to an action taken by a user on a web page or an application installed on a computing device (e.g., the PAYPAL app on a smartphone). Many or all of the records in records database 230 are transaction records including details of a user sending or receiving currency (or some other quantity, such as credit card award points, cryptocurrency, etc.).

Turning to FIG. 3A, a block diagram is shown of one embodiment of a transaction history. As shown, active user transaction history 300 corresponds to a user who has had a category of 'active user' assigned to her contextual user profile based on an analysis of the transaction history. The records shown in FIG. 3A be contained in records database 230. In this example, the records shown include various transactions made by different funding mechanisms.

As shown, field 302 includes an event ID. This may be a globally unique event identifier within an enterprise associated with transaction system 260. Thus, in one embodiment, the event ID in field 302 includes a unique ID for each of millions of electronic payment transactions processed by a service provider such as PayPal™. Field 304 includes a unique account ID for a user.

Field 306 includes type of transaction, while field 308 includes a transaction amount. A positive transaction amount indicates a user is receiving money, while a negative amount indicates the user is spending money. In this example, the user has spent money seven times between May 18, 2017 and May 28, 2017. As shown, these spending amounts are funded by various sources, including credit card, Automated Clearinghouse (ACH), debit card, and account balance spending. In row 7 of history 300, the user has received $20.00 as a transfer (e.g. from another PayPal™ account). Field 310 represents a date of transaction.

As will be appreciated, a user account history may contain a variety of different and/or additional information (and in some embodiments, one or more fields shown in FIG. 3A may be omitted). Thus, many additional pieces of information may be present in records database 230 in various embodiments. An email address associated with an account (e.g. which can be used to direct an electronic payment to a particular account using only that email address) can be listed. Home address, phone number, and any number of other personal details can be listed. Further, in various embodiments, databases may include event information on actions associated payment transaction, such as actions taken relative to a website, or relative to an application installed on a device such as the PAYPAL application on a smartphone. Database information can therefore include web pages visited (e.g., did a user travel to www.PayPal.com from www.eBay.com, or from some other domain?), order in which the pages were visited, navigation information, etc. Database information can include actions taken within an application on a smartphone such as the PayPal™ app. Database information can also include a location of where a user has logged into (authenticated) an account; unsuccessful login attempts (including IP address etc.); time of day and/or date of week for any event mentioned herein; funding sources added or removed and accompanying details (e.g. adding a bank account to allow currency to be added to or withdrawn from a user account), address or other account information changes, etc.

An analysis of active user transaction history 300 will indicate, in various embodiments, that a user of an account falls into one of a group of several different categories. One or more analysis rules can be used to categorize a user into the categories. In one embodiment, categories include (1) active user; (2) light active user; (3) net new active user; (4) casual seller; and (5) P2P user.

In FIG. 3A, the user is an "active user" according to his account transaction history in this embodiment. As can be seen, this user has used a transaction account eight times within a period of eleven days. A light active user may be similar to a user in the type of transaction activity engaged in, but has less frequency (perhaps less than 2 average transactions a month). A net new active user may be any user that has received a new account within a certain period of time and/or has engaged in less than a particular number of transactions. A casual seller may be a small business user who receives money often but not in the large amounts that a mid-size or bigger merchant might receive (e.g., the casual seller may sell a few items every month on an online e-commerce site such as eBay.com™. A P2P user may be a user who frequently engages in transactions with friends and family, with transaction values that may be on the lower end of the spectrum seen by an electronic transaction service provider.

User categorization rules can be used, in various embodiments, to classify a user based on a transaction history. Different guidelines can be specified based on various information, including but not limited to: frequency of account usage (e.g. number of transactions in a given period); price/cost of transactions; type of transaction (was the user a purchaser/buyer, or a seller, e.g., did the user receive money or send money), type of other user in the transaction (was the other seller a known merchant, etc.), funding source for the transaction (was the transaction balance-funded, credit card funded, etc.), details about goods or services purchased (was the transaction a bill payment, did it buy airline tickets or hotel rooms, etc.). In general, any transaction detail information can be used to classify accounts into one of a plurality of categories that can then be used as a basis for dynamic web site content generation. (Note of course that data privacy laws may apply in various jurisdictions and may limit the information used to make such categorizations.)

Turning to FIG. 3B, a block diagram is shown of one embodiment of a transaction history. As shown, merchant transaction history 350 corresponds to a user who has had a category of 'casual seller' assigned to his contextual user profile based on an analysis of the transaction history. The various fields shown in casual seller transaction history 350 are similar to those already discussed above relative to active user transaction history 300. In this instance, however, the fact that the user is often receiving money may indicate that the user is a seller of goods and/or services.

Figure 4A:
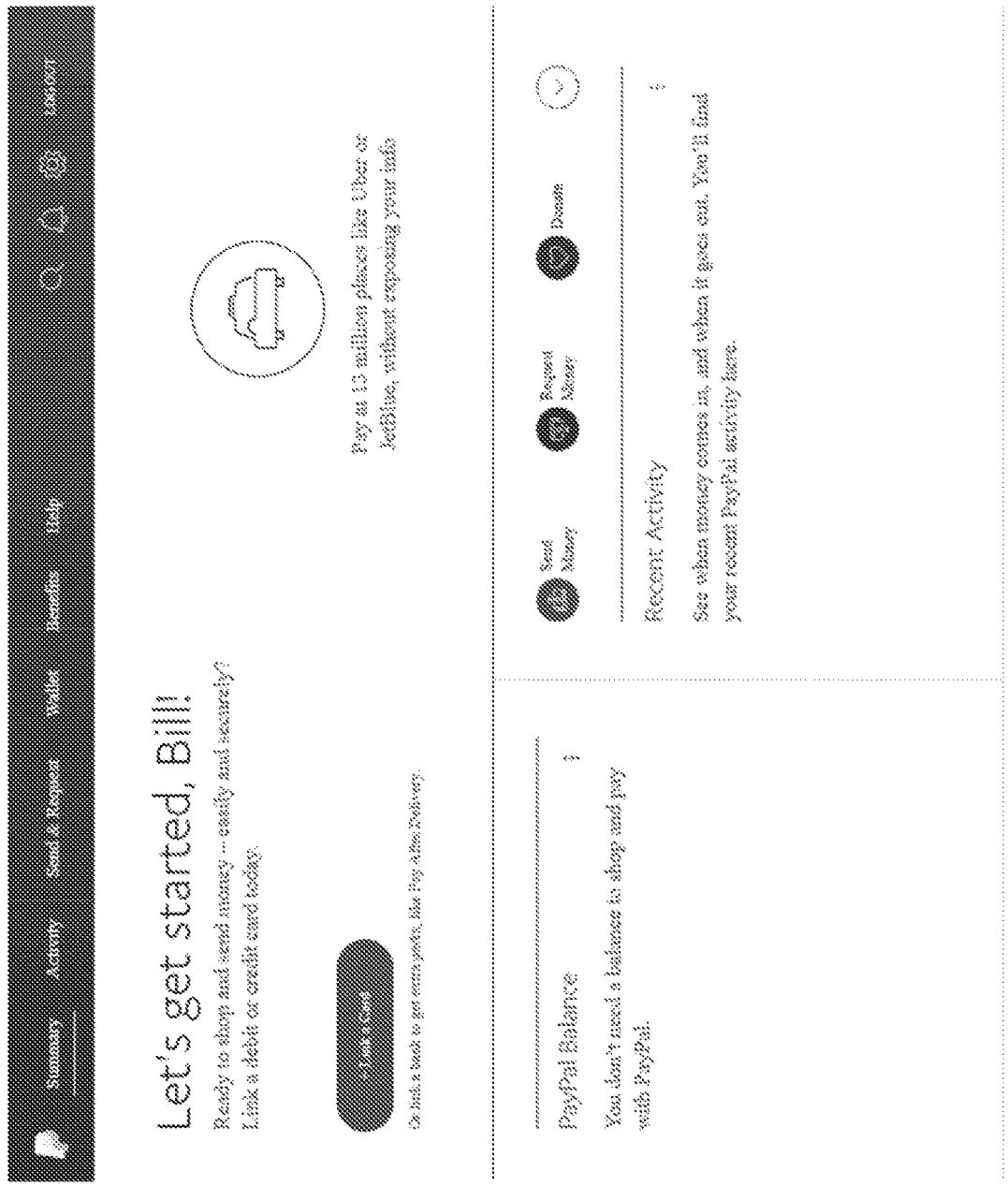
Figure 4B:
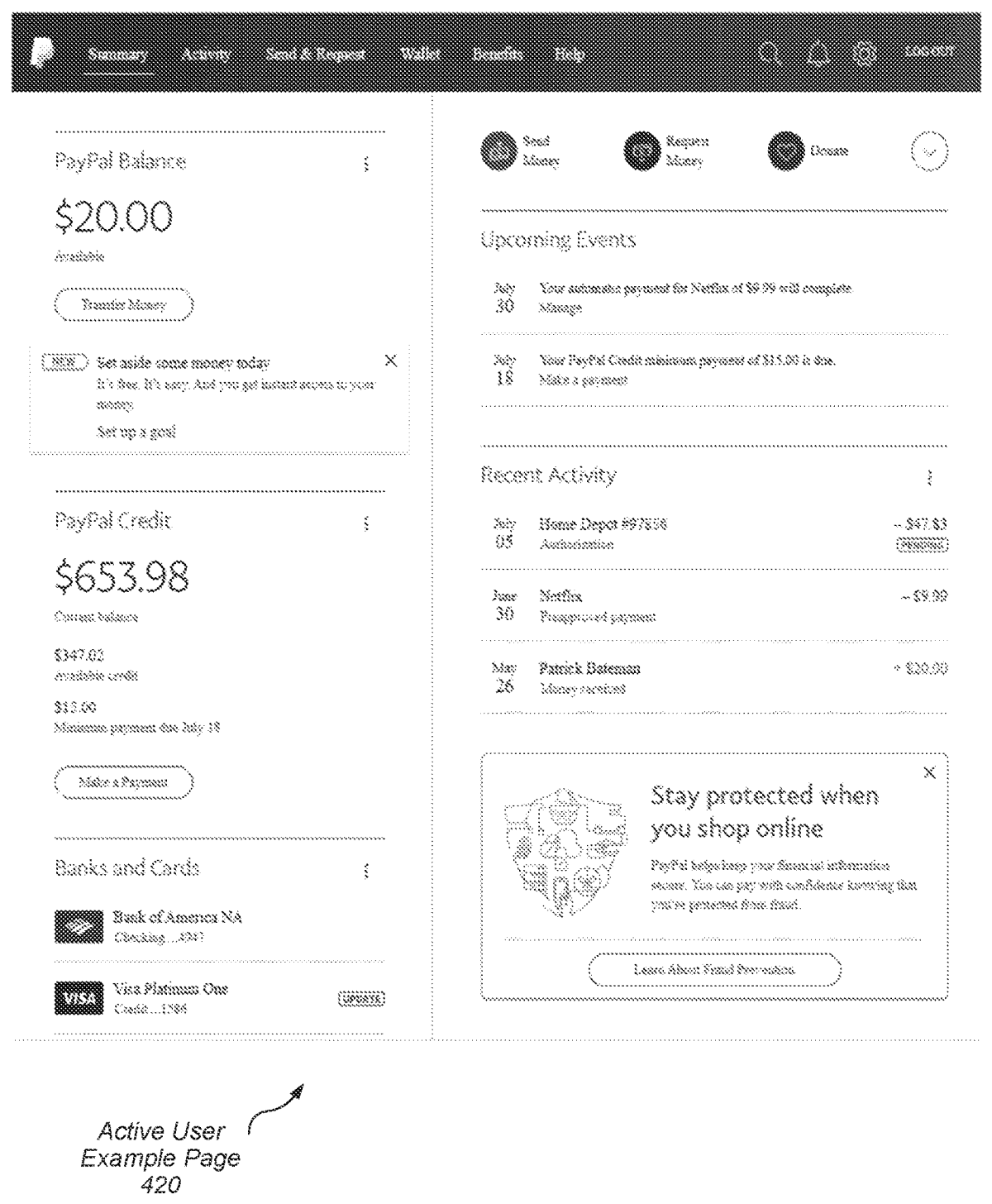

Turning to FIG. 4A, an example diagram is shown of an embodiment of a web page having dynamically generated content based on an analysis of user account history. In this case, new example active page 410 shows a portion of a web page that includes content dynamically generated for a 'net new active' user. In FIG. 4B, an embodiment of a web page 420 with dynamically generated content for an 'active' user is shown, while in FIG. 4C, an embodiment of a web page 430 is shown with dynamically generated content for a 'casual seller' user. Note that each of these pages have various content modules, with each module itself also having personalized content. Web pages 410 and 420 both have a "PayPal balance" content module, but these modules each have differing appearances. Meanwhile, a "PayPal credit" module does not appear on the net new active user example web page 410, while it does appear on web page 420. Likewise, a "needs attention" content module appears in casual seller example web page 430 while it does not appear on web pages 410 and 420.

Figure 4C:
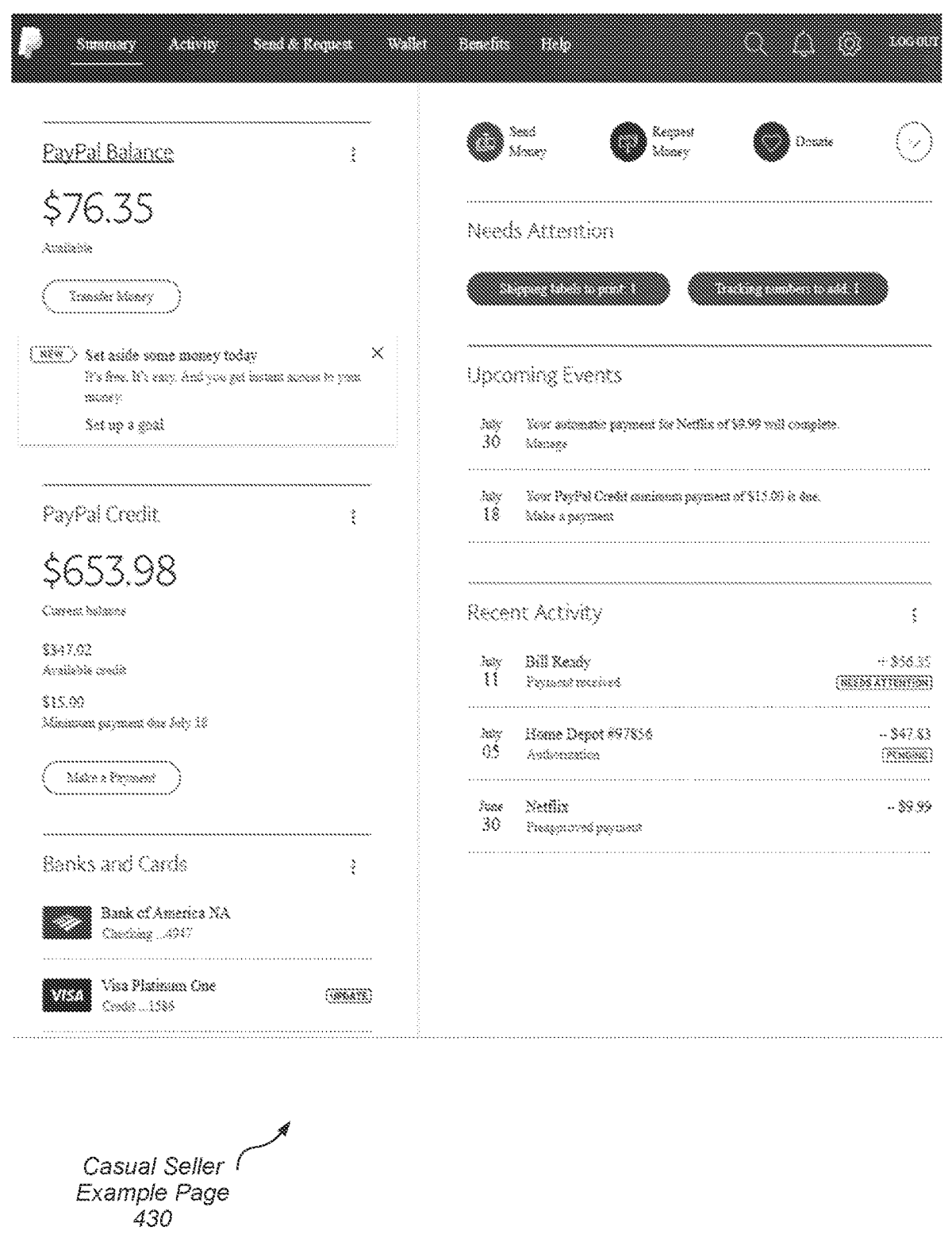

Additionally, as can be seen in the examples of FIGS. 4A, 4B, and 4C, there is a display area (on the top of the pages) that is not configured to be populated with dynamic content based on a contextual user profile. Stated another way, the menu portion in the top display area (showing items such as "Summary", "Activity", "Send & Request", etc.) appears the same regardless of the usage details of the user's transaction history. A similar display area without dynamic content can also be found at the bottom of some web pages (although omitted in these examples). Meanwhile, display areas on the left and right of the web pages show various dynamic content modules (that also include account-specific layout information and data, in some instances). Again, note that the layouts presented herein are only examples, and display areas may be organized in many different ways.

Figure 5:
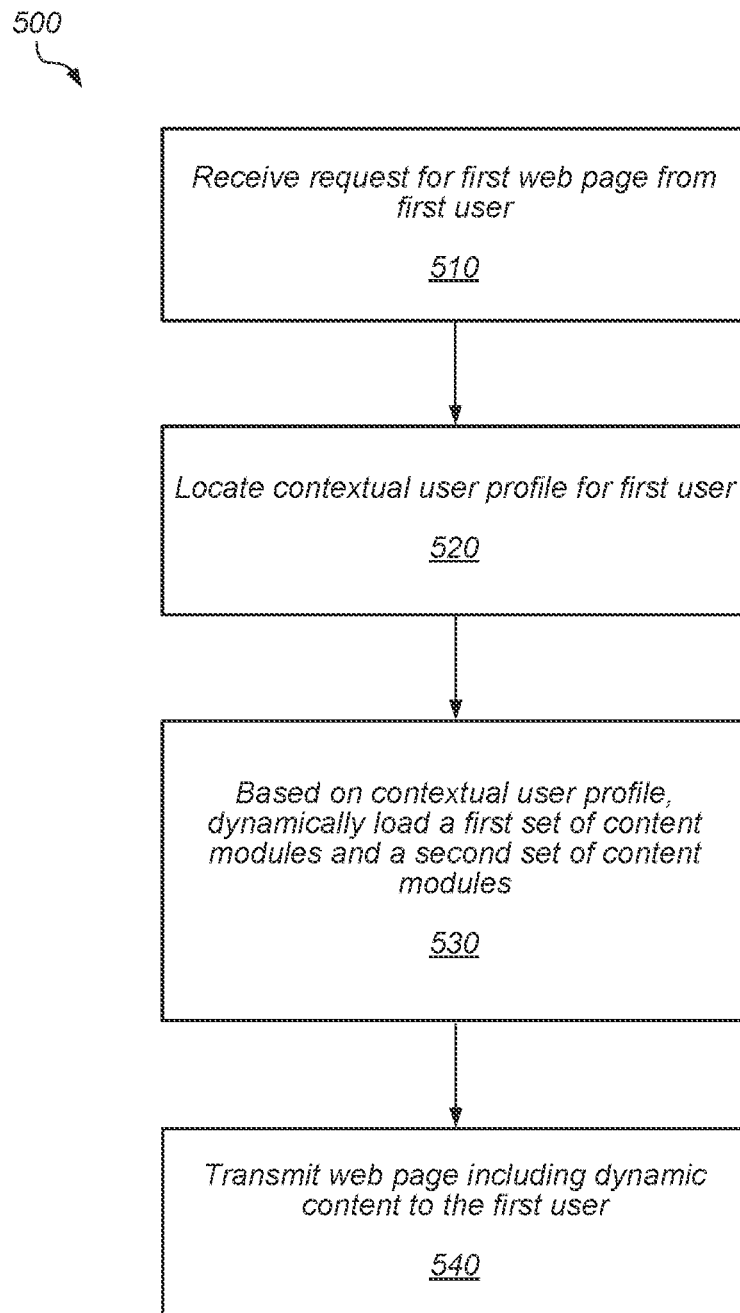
FIG. 5 illustrates a flow diagram of a method that relates to constructing a web page with dynamic content that is based on an analysis of a user's underlying transaction history, according to some embodiments.

Turning now to FIG. 5, a flow diagram is shown illustrating a method 500 that relates to constructing a web page with dynamic content that is based on an analysis of a user's underlying transaction history and/or additional information including user interactions with particular software products, services, and/or web pages, and user account history, according to some embodiments.

Operations described relative to FIG. 5 may be performed, in various embodiments, by any suitable computer system and/or combination of computer systems, including web server system 220 and/or contextual system 225. For convenience and ease of explanation, however, operations described below will simply be discussed relative to web server system 220. Further, various elements of operations discussed below may be modified, omitted, and/or used in a different manner or different order than that indicated. Thus, in some embodiments, web server system 220 might perform one or more aspects described below, while contextual system 225 and/or transaction system 260 (or another system) might perform one or more other aspects.

In operation 510, web server system 220 receives a request for a first web page from a first user. This request may be received via hypertext transfer protocol (HTTP) as a request sent from a user's web browser or other applications. (Note that the HTTPS protocol is also included by the term HTTP, as used herein.)

The web page in operation 510 may have a plurality of configurable display areas that are configured to be populated with dynamic content based on a contextual user profile for a first user. These configurable display areas include display areas 120 and 130, in one embodiment. The first web page may also have an additional display area not configured to be populated with dynamic content based on the contextual user profile, such as display areas 110 and 140, in some embodiments.

In operation 520, web server system 220 locates a contextual user profile for the first user. This operation may be performed by fetching the contextual user profile from contextual system 225 or transaction system 260, for example, or simply having a system transmit the contextual user profile. Note that web server system 220 may receive the contextual user profile in advance of the web page request, in various embodiments, which can speed operations.

The contextual user profile for the first user can include a variety of information, and may be generated based on an analysis of a transaction history for the first user. This transaction history can be a PayPal™ account usage history, for example, detailing a plurality of electronic payment transactions.

Analysis of the transaction history can be performed by contextual system 225, or another system, in some cases. This analysis may review transactions and produce one or more resulting metrics and/or apply a set of rules on the transaction activity. Note that additional information outside of a transaction history may also be used as part of the analysis (e.g. other account details and/or outside sources of information).

One of several different usage categories can also be assigned to the contextual user profile based on a result of the transaction history analysis. This assignment can likewise be performed by contextual system 225 (or any other system). Categories such as active user, light user, casual seller, etc., may be assigned to a user's profile. Note that the categories that can be assigned to a contextual user profile are not limited to these examples, however.

Additional information beyond a transaction history can be used as part of a contextual user profile. This additional information can be used to determine a usage category assigned to the contextual user profile.

User interactions with particular software products and services are part of a contextual user profile in some embodiments. For example, if a modular content module is used for a "PayPal Credit" product, a history of the user interacting with that module (e.g. via the web page on which that module is displayed) can be maintained by contextual system 225 or another system. This history may contain a record of actions that the user took relative to that software product (e.g. opening a control menu, requesting particular information, issuing particular commands, making specific payments and/or transfers, etc.) Actions taken outside of a specific modular content module can also affect the contextual user profile. For example, a user might take an action via a smartphone app or via a telephone conversation with a customer support representative. History of such actions can by maintained and used as part of a contextual user profile. User account history, such as the length an account has been in existence, can also be a part of contextual user profiles.

Locating a contextual user profile can be performed based on an account identity, in some instances. If a user has authenticated their login into a PayPal™ account, for example, that account identity can be used to locate the contextual user profile (e.g. by a querying a database using a unique account identifier as a key, for example).

In operation 530, web server system 220 dynamically loads a first set of one or more content modules and a second set of one or more content modules. This loading is performed based on the contextual user profile (e.g. based on an assigned category for the user) in various instances.

The first set of content modules can be loaded into a first configurable display area such as display area 120, while the second set of content modules can be loaded into a second configurable display area such as display area 130. This can therefore result in various content modules being loaded into specific locations within two or more different display areas.

In some embodiments, specific different configuration files are used for dynamically loading the content modules into the configurable display areas. A different configuration file may exist, for example, for each of the different usage categories that can be assigned to a contextual user profile. These configuration files can be parsed and then used to specify the layout of various content modules. Referring to FIG. 4B, for example, a configuration file for an 'active user' category may specify that the "PayPal Balance" content module appears in a first column A (e.g. display area 120) in the top-most position, followed by a "PayPal Credit" content module in column A, second position. Similar specifications can be made for other content modules.

In operation 540, web server system 220 transmits the web page, including the dynamically loaded content, to the user who has made a request. The web page may then be rendered on a computer system's display device for the user. The web page sent back to the requesting user can, of course, be interacted with further. In some cases, a user may select dynamically generated content to view even more content (e.g., a user could selected a drop-down menu in a "PayPal Balance" content module to get various commands selectable to take an action relative to the user's account balance.

Figure 6:
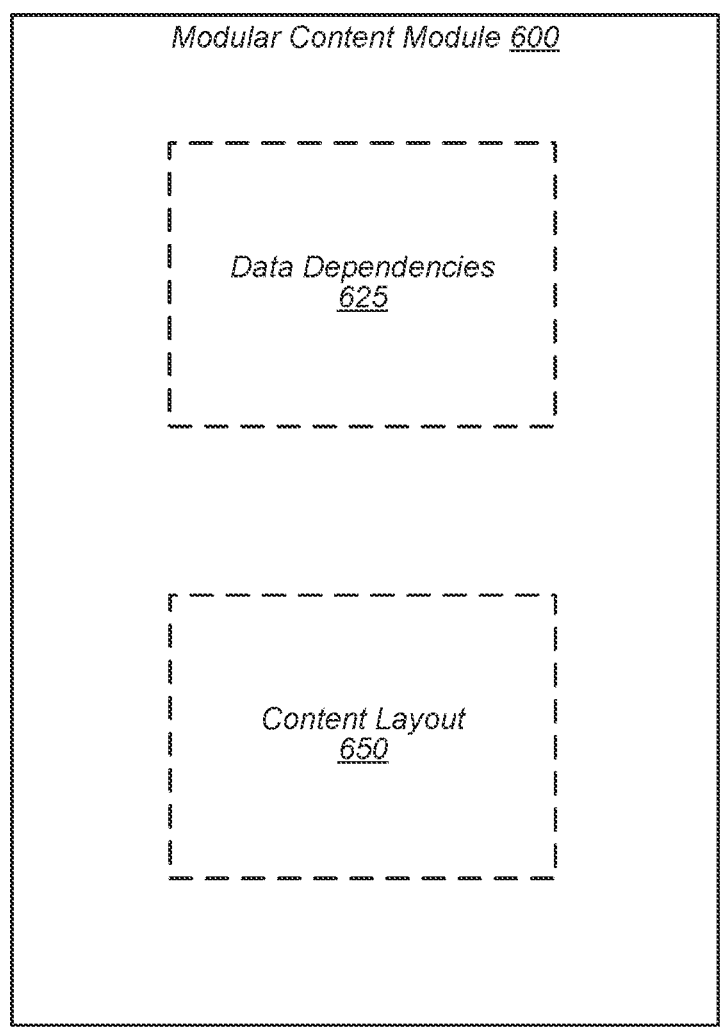
FIG. 6 illustrates a block diagram of a modular content module usable with dynamic content generation, according to some embodiments.

Turning to FIG. 6, a block diagram is shown of a modular content module, according to some embodiments. In this figure, modular content module (MCM) 600 includes data dependencies 625 and content layout 650. MCM 600 may be implemented as instructions and/or data stored on a computer-readable medium.

MCM 600 may correspond to any of the dynamic content modules shown in FIG. 1, for example, as well as the additional examples shown in FIGS. 4A-4C. Thus, a particular category for a contextual user profile may/be associated with many different MCMs.

Note that in various embodiments, MCM 600 is fully self-contained (e.g. modular). What this means is that MCM 600 can be re-used in a variety of different contexts, such as different web pages, without having to undertake special operations to integrate the functionality of MCM 600 into a second web page.

Nonetheless, MCM 600 may still have certain data dependencies 625. Even though self-contained, MCM 600 may have to pull data from external sources when its content is rendered. Consider a "PayPal Balance" MCM. This module, when executed, may have to contact an internal PayPal™ database to query a user's account and find out how much saved currency they have in their PayPal™ account (e.g., $20.00). Likewise, various data queries may need to be made in order to fully render the content for a MCM.

Content layout 650 includes specifications on how particular content should be displayed within an MCM. For example, it may indicate whether an image is placed in a particular portion of MCM 600's display area, size of graphical text being displayed, particular visual content to be displayed (e.g. images), etc. Content layout 650 may thus contain various rules and specifications dictating the appearance of content within MCM 600 when MCM 600 is rendered on a web page.

Computer-Readable Medium

Figure 7:
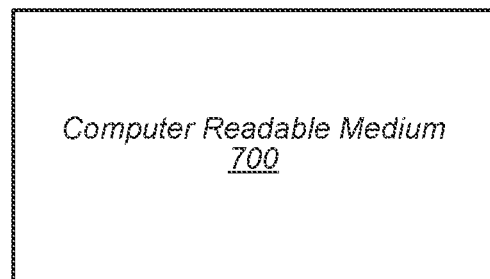
FIG. 7 is a diagram of a computer readable medium, according to some embodiments.

Turning to FIG. 7, a block diagram of one embodiment of a computer-readable medium 700 is shown. This computer-readable medium may store instructions corresponding to the operations of FIG. 5 and/or any techniques described herein. Thus, in one embodiment, instructions corresponding to web server system 220, contextual system 225, and/or any other system may be stored on computer-readable medium 700.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, JAVA, JAVASCRIPT, or any other scripting language, such as VBScript. Note that as used herein, the term "computer-readable medium" refers to a non-transitory computer readable medium.

Computer System

Figure 8:
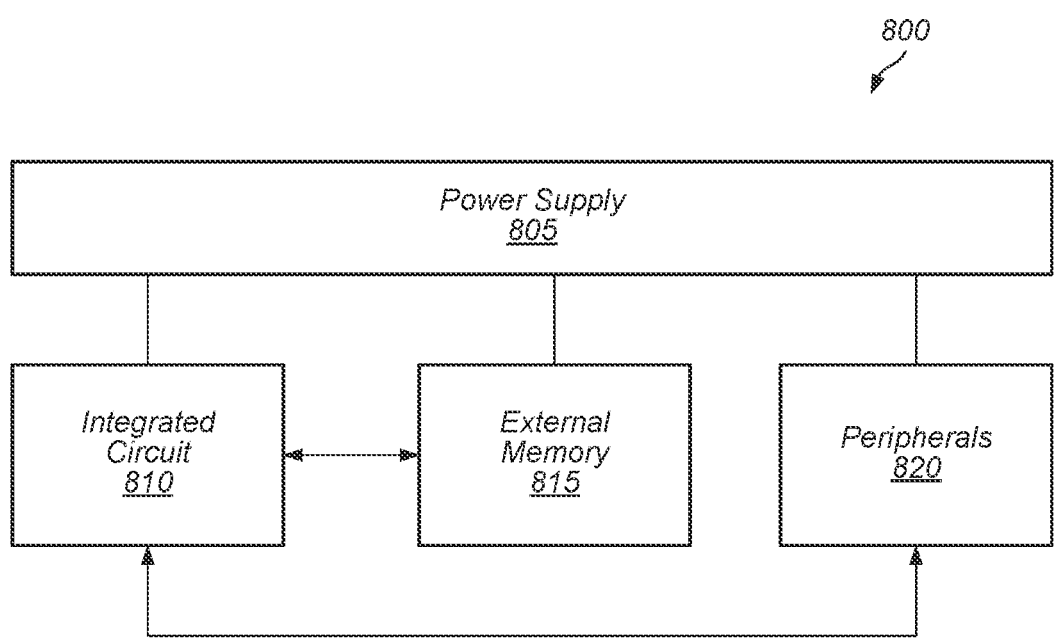
FIG. 8 is a block diagram of a system, according to some embodiments.

In FIG. 8, one embodiment of a computer system 800 is illustrated. Various embodiments of this system may be web server system 220, contextual system 225, transaction system 260, or any other computer system as discussed above and herein.

In the illustrated embodiment, system 800 includes at least one instance of an integrated circuit (processor) 810 coupled to an external memory 815. The external memory 815 may form a main memory subsystem in one embodiment. The integrated circuit 810 is coupled to one or more peripherals 820 and the external memory 815. A power supply 805 is also provided which supplies one or more supply voltages to the integrated circuit 810 as well as one or more supply voltages to the memory 815 and/or the peripherals 820. In some embodiments, more than one instance of the integrated circuit 810 may be included (and more than one external memory 815 may be included as well).

The memory 815 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 810 in a chip-on-chip configuration, a package-on-package configuration, or a multi-chip module configuration.

The peripherals 820 may include any desired circuitry, depending on the type of system 800. For example, in one embodiment, the system 800 may be a mobile device (e.g. personal digital assistant (PDA), smart phone, etc.) and the peripherals 820 may include devices for various types of wireless communication, such as WIFI, BLUETOOTH, cellular, global positioning system, etc. Peripherals 820 may include one or more network access cards. The peripherals 820 may also include additional storage, including RAM storage, solid state storage, or disk storage. The peripherals 820 may include user interface devices such as a display screen, including touch display screens or multitouch display screens, keyboard or other input devices, microphones, speakers, etc. In other embodiments, the system 800 may be any type of computing system (e.g. desktop personal computer, server, laptop, workstation, net top etc.). Peripherals 820 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having stored thereon instructions executable by a computer system to cause the computer system to perform operations comprising:
receiving, via hypertext transfer protocol (HTTP), a request for a first web page from a first user device, the first web page having a plurality of configurable display areas that are configured to be populated with dynamic content based on a user profile for a first user having a first user account of an electronic service provider, the first web page having an additional display area not configured to be populated with dynamic content based on the user profile;

accessing the user profile, the user profile having been generated by operations comprising:

performing an analysis of a transaction history of the first user account, including analyzing a plurality of historical electronic payment transactions conducted using the first user account within a particular period of time; and based on the analysis indicating whether a threshold amount of the historical electronic payment transactions included the first user account taking one or more types of particular actions relative to one or more other user accounts of the electronic service provider, determining a particular classification category for the first user account from a plurality of classification categories, wherein each of the plurality of classification categories is associated with at least one of the one or more types of particular actions;

based on the user profile, arranging a content layout of the configurable display areas on the first web page, wherein a placement of the configurable display areas on the first web page changes the content layout of the first web page from an appearance to a second user having a second user account of the electronic service provider, wherein the second user account has a different classification category of the plurality of classification categories;

determining, for the user profile, a set of one or more dynamic content pieces to be generated based on personal information associated with the first user account, at least one of the one or more content pieces including content specifying information derived from one or more of the plurality of historical electronic payment transactions that were conducted using the first user account within the particular period of time;

generating the set of dynamic content pieces based on the personal information associated with the first user account;

placing the set of dynamic content pieces into one or more of the plurality of configurable display areas of the first web page based on a content layout of different areas on the first web page; and transmitting the first web page to the first user device.

2. The non-transitory computer-readable medium of claim 1, wherein the placing the set of dynamic content pieces comprises:

generating a plurality of content modules comprising the set of dynamic content pieces; and placing the plurality of content modules into the one or more of the plurality of configurable display areas of the first web page.

3. The non-transitory computer-readable medium of claim 2, wherein each of the plurality of configurable display areas includes at least one of the plurality of content modules.

4. The non-transitory computer-readable medium of claim 2, wherein each of the plurality of content modules comprises a corresponding one of the set of dynamic content pieces.

5. The non-transitory computer-readable medium of claim 1, wherein the operations further comprise:

receiving, from the first user device, a selection of a control component displayed within a particular one of the configurable display areas; and responsive to the selection, loading additional data from a database accessible to the computer system; and causing the additional data to be displayed within the particular configurable display area.

6. The non-transitory computer-readable medium of claim 1, wherein the set of dynamic content pieces content includes information specifying one or more dates corresponding to one or more of the historical electronic payment transactions.

7. The non-transitory computer-readable medium of claim 1, wherein the operations further comprise:

accessing one or more databases containing personal information for the first user other than the transaction history, wherein the particular classification category for the first user is based on the personal information.

8. The non-transitory computer-readable medium of claim 1, wherein accessing the user profile is performed using a database search based on a unique identifier for the first user account.

9. A system, comprising:

a processor; and a non-transitory computer-readable medium having stored thereon instructions executable by the processor to cause the system to perform operations comprising:

receiving, via hypertext transfer protocol (HTTP), a request for a first web page from a first user device, the first web page having a plurality of configurable display areas that are configured to be populated with dynamic content based on a user profile for a first user having a first user account of an electronic service provider, the first web page having an additional display area not configured to be populated with dynamic content based on the user profile;

accessing the user profile, the user profile having been generated by operations comprising:

performing an analysis of a transaction history of the first user account, including analyzing a plurality of historical electronic payment transactions conducted using the first user account within a particular period of time; and based on the analysis indicating whether a threshold amount of the historical electronic payment transactions included the first user account taking one or more types of particular actions relative to one or more other user accounts of the electronic service provider, determining a particular classification category for the first user account from a plurality of classification categories, wherein each of the plurality of classification categories is associated with at least one of the one or more types of particular actions;

based on the user profile, arranging a content layout of the configurable display areas on the first web page, wherein a placement of the configurable display areas on the first web page changes the content layout of the first web page from an appearance to a second user having a second user account of the electronic service provider, wherein the second user account has a different classification category of the plurality of classification categories;

determining, for the user profile, a set of one or more dynamic content pieces to be generated based on personal information associated with the first user account, at least one of the one or more content pieces including content specifying information derived from one or more of the plurality of historical electronic payment transactions that were conducted using the first user account within the particular period of time;

generating the set of dynamic content pieces based on the personal information associated with the first user account;

placing the set of dynamic content pieces into one or more of the plurality of configurable display areas of the first web page based on a content layout of different areas on the first web page; and transmitting the first web page to the first user device.

10. The system of claim 9, wherein the placing the set of dynamic content pieces comprises:

generating a plurality of content modules comprising the set of dynamic content pieces; and placing the plurality of content modules into the one or more of the plurality of configurable display areas of the first web page.

11. The system of claim 10, wherein each of the plurality of configurable display areas includes at least one of the plurality of content modules.

12. The system of claim 10, wherein each of the plurality of content modules comprises a corresponding one of the set of dynamic content pieces.

13. The system of claim 9, wherein the operations further comprise:

receiving, from the first user device, a selection of a control component displayed within a particular one of the configurable display areas; and responsive to the selection, loading additional data from a database accessible to the computer system; and causing the additional data to be displayed within the particular configurable display area.

14. The system of claim 9, wherein the set of dynamic content pieces content includes information specifying one or more dates corresponding to one or more of the historical electronic payment transactions.

15. The system of claim 9, wherein the operations further comprise:

accessing one or more databases containing personal information for the first user other than the transaction history, wherein the particular classification category for the first user is based on the personal information.

16. A method, comprising:

receiving at a computer system, via hypertext transfer protocol (HTTP), a request for a first web page from a first user device, the first web page having a plurality of configurable display areas that are configured to be populated with dynamic content based on a user profile for a first user having a first user account of an electronic service provider, the first web page having an additional display area not configured to be populated with dynamic content based on the user profile;

the computer system accessing the user profile, the user profile having been generated by operations comprising:

performing an analysis of a transaction history of the first user account, including analyzing a plurality of historical electronic payment transactions conducted using the first user account within a particular period of time; and based on the analysis indicating whether a threshold amount of the historical electronic payment transactions included the first user account taking one or more types of particular actions relative to one or more other user accounts of the electronic service provider, determining a particular classification category for the first user account from a plurality of classification categories, wherein each of the plurality of classification categories is associated with at least one of the one or more types of particular actions;

based on the user profile, arranging a content layout of the configurable display areas on the first web page, wherein a placement of the configurable display areas on the first web page changes the content layout of the first web page from an appearance to a second user having a second user account of the electronic service provider, wherein the second user account has a different classification category of the plurality of classification categories;

determining, for the user profile, a set of one or more dynamic content pieces to be generated based on personal information associated with the first user account, at least one of the one or more content pieces including content specifying information derived from one or more of the plurality of historical electronic payment transactions that were conducted using the first user account within the particular period of time;

generating the set of dynamic content pieces based on the personal information associated with the first user account;

placing the set of dynamic content pieces into one or more of the plurality of configurable display areas of the first web page based on a content layout of different areas on the first web page; and transmitting the first web page to the first user device.

17. The method of claim 16, wherein the placing the set of dynamic content pieces comprises:

generating a plurality of content modules comprising the set of dynamic content pieces; and placing the plurality of content modules into the one or more of the plurality of configurable display areas of the first web page.

18. The method of claim 17, wherein each of the plurality of configurable display areas includes at least one of the plurality of content modules.

19. The method of claim 17, wherein each of the plurality of content modules comprises a corresponding one of the set of dynamic content pieces.

20. The method of claim 16, further comprising:

receiving, from the first user device, a selection of a control component displayed within a particular one of the configurable display areas; and responsive to the selection, loading additional data from a database accessible to the computer system; and causing the additional data to be displayed within the particular configurable display area.

* * * * *